United States Patent [19]

Tauber et al.

[11] Patent Number: 4,707,165

[45] Date of Patent: Nov. 17, 1987

[54] GAS AND FLUID SEPARATOR

[75] Inventors: Thomas E. Tauber, Lansdowne; James L. Horan, Morton, both of Pa.

[73] Assignee: Aeroquip Corporation, Jackson, Mich.

[21] Appl. No.: 708,003

[22] Filed: Mar. 4, 1985

[51] Int. Cl.[4] .............................................. B01D 19/00
[52] U.S. Cl. ........................................ 55/204; 55/213; 210/108; 210/168
[58] Field of Search ......................... 55/204, 171, 213; 210/168, 188

[56] References Cited

U.S. PATENT DOCUMENTS

| | | | |
|---|---|---|---|
| 3,273,313 | 9/1966 | Livesey et al. | 55/46 |
| 3,364,658 | 1/1968 | Walker | 55/171 |
| 4,282,016 | 8/1981 | Tauber | 55/204 |
| 4,372,848 | 2/1983 | Manders | 210/168 X |

Primary Examiner—Charles Hart
Attorney, Agent, or Firm—Lipton & Famiglio

[57] ABSTRACT

An apparatus for removing entrapped gas in a fluid is disclosed. The invention is particularly useful in separating air from oil used in engines and transmissions. The inlet for the oil and air, the exit for the air, and the oil exit are all located at the same end of the invention. This facilitates its use in a variety of engine and transmission configurations. Oil enters tangentially at the top of a cylindrical housing and is caused to cyclonically work its way down to the bottom of the housing. The oil is then forced to reverse its flow and travel upward with a downwardly projecting shroud. The oil is forced to enter an oil outlet tube which is connected to the top of the shroud and which passes through the top of the housing. An air outlet tube projects downwardly from the center of the top portion of the housing. The oil outlet tube is located concentrically within the air outlet tube. As the air circulates within the top portion of the cylindrical housing, the oil is centrifugally forced outward, while the lighter air coalesces and moves towards the center of the apparatus. The air passes into the gap formed by the oil and air outlet tubes where it is channeled to the air exit tube.

In other embodiments, the apparatus includes a filter which filters out solid particles; includes an internal pressure through a relief valve which permits the oil to bypass the filter if it becomes clogged sufficiently to prohibit the passage of oil through the filter; includes a false bottom where the solid particles are trapped thereby permitting ease of the removal of the filter; includes around the filter a shroud which helps insure that little or no air passes through the filter.

8 Claims, 8 Drawing Figures

GAS AND FLUID SEPARATOR

BACKGROUND OF THE INVENTION

This invention relates generally to devices which separate a gas and a liquid. The apparatus is particularly useful in separating air from oil. This is particularly useful in lubricating systems for gas turbine engines. Such systems are also applicable to transmission systems in general, and aircraft power transmissions in particular. Gas separators of this type may be combined with particle detection systems which monitor the metal particles which are normally and constantly being added to the oil during the course of normal use. Such systems are adapted to detect an increase in the quantity of such particles and to monitor the size of such particles, as an increase in either quantity or size may be indicative of an incipient structural failure.

Wear particles are generally two to twenty microns in size. Particles of this size, when suspended in a circulating fluid such as heavy lubricating oil, generally move with it rather than reacting promptly to gravitational and inertial forces. The quantity of such particles is normally relatively low and are readily removed from the system through the use of suitable filters, or by strategically placed magnets if the particles are magnetic.

When the components of the system which is being lubricated become overloaded or when localized areas of weaknesses occur, the situation changes radically. In such cases, much larger particles, or failure particles, of material become loosened generally at the point of contact between moving parts under high surface pressure. Once the surface has been deformed by the breaking off of such particles, the rate of deterioration accelerates, resulting in the breaking off of additional particles at increasing rates. Thus, the quantities of the wear particles produced are substantially increased. The larger or failure particles are also generated at ever increasing sizes. Failure particles generally fall into the one hundred to two thousand micron size range. Due to their greater mass, they are less subject to being suspended in the lubricating fluid and are forced outward by the centrifugal forces generated by a cyclonic debris separator.

Engine lubricating systems and transmission systems churn their fluids, causing them to be mixed with air, causing formations of foam which are often highly stable. In many systems, equal amounts of air, by volume, are mixed with the oil. In still other high speed applications such as the lubrication systems for gas turbines, as many as four parts of air may be mixed with one part of oil, by volume. Such dilution of the oil is obviously undesirable since it results in less oil coming in contact with the surfaces requiring lubrication, thus diminishing the lubricating effect of the oil. The presence of air in the oil results in the air being compressed, thus lowering the overall system pressure. This is particularly true when displacement type pumps are used, as is common in these types of systems.

Additionally, the cooling effect of the oil is substantially reduced by such entrapped air. This, of course, increases the probabilities of overheating and accelerated wear.

Cyclonic debris separators have been combined with filters for removing wear particles. Such a device is disclosed in U.S. Pat. No. 4,199,443, issued to Thomas E. Tauber on Apr. 22, 1980.

Cyclonic separators for removing entrapped air from oil are well known in the prior art. One such device is disclosed in U.S. Pat. No. 4,282,016, issued Aug. 4, 1981 to Thomas E. Tauber, et al, entitled "Gas and Failure Particle Separator System". This invention discloses a separator system combined with a particle detector wherein the oil and air enter through the top of the device, as does the separated air, while the oil exits from the bottom of the device.

Separators for removing air from oil necessarily require three inlets or outlets. One inlet is required for the oil with the entrapped air. One outlet is required for the air subsequent to its removal, and another outlet is required for the oil. The prior art devices have had inlets and outlets at both ends of the separator. This has caused problems in installing the apparatus where there are space limitations. Such space limitations are common in an aircraft environment.

It has been recognized in the prior art that it is desirable to combine devices having single functions to obtain a device having multiple functions. Oil filters have been provided to remove wear particles, particle separators have been provided to aid in the detection of failure particles, and air separators have been provided to remove entrapped air from oil. U.S. Pat. No. 4,199,443 to Tauber teaches the combining of a filter for wear particles with a cyclonic debris separator for aiding in the detection of failure particles; while U.S. Pat. No. 4,282,016 to Tauber, et al teaches the use of a cyclonic debris separator to separate air from oil, as well as aiding in the collection and detection of failure particles.

SUMMARY OF THE INVENTION

The present invention provides a separator which segregates air from oil and which has a configuration wherein the inlet and two outlets are located at the same end of the device. This greatly facilitates the incorporation of the device in the components of various power transmission or generation systems.

The invention may be combined with an oil filter for removing wear particles. The invention may also be combined with a collection and detection system for failure particles. In a preferred embodiment, the invention is combined with both a filter and a collection and detection system for failure particles.

The basic invention includes an oil inlet for injecting the oil with its entrapped air tangentially into the top portion of a cylinder. The terms "top" and "bottom" are used herein as an arbitrary reference based upon the position of the invention in the drawings hereof, they do not refer to the position of the invention with respect to gravity or any other force field in which the entire device is subjected to. An air outlet tube projects downwardly from the top portion of the cylinder. An oil outlet tube, which is positioned concentrically within the air outlet tube, also projects downwardly from the top portion of the cylinder thereby forming a gap between the two tubes. The oil outlet tube projects downwardly to a greater extent than the air outlet tube. A shroud, which also projects downwardly, is connected to the bottom of the oil outlet tube.

After the oil enters the top portion of the cylinder, it cyclonically works its way downward between the shroud and the cylindrical housing until it passes below the shroud, and then cyclonically works its way upward through a hole in the top portion of the shroud and exits through the oil outlet tube. After the oil has entered the top portion of the cylindrical housing, the oil is centrifugally forced outward and the entrapped air inward. The entrapped air works its way towards the center of the cylindrical housing where it passes in the annular space formed between the oil outlet tube and the air outlet tube. The air is then forced into an air exit tube which permits it to leave the top portion of the housing.

A cylindrical oil filter may be placed within the shroud so that its comes in contact with the bottom of the cylindrical housing so that all oil must pass beneath the shroud and through the oil filter before it reaches the oil outlet tube.

In an embodiment of the invention, a false bottom, i.e. an inwardly projecting annular rim may be positioned in the top portion of the cylindrical housing, above the shroud and below the oil inlet. One cavity may be formed just above the annular rim. Magnetic chip detectors, or any other suitable chip detectors, may be placed within the cavity. As the oil tangentially enters the upper portion of the cylinder, the centrifugal forces cause the heavier failure particles to be forced against the outer wall of the upper portion of the housing where they abut the annular rim due to the downward flow of the oil. They are then swept into the cavity where they are detected.

The chip detection cavity may also be formed at the juncture of the cylindrical housing and the bottom of the housing. However, for most applications, it is desirable to have the cavity and, hence, the chip detector located at the same end of the device as the inlet and outlets. This enables the invention to be configured, in combination with an engine or transmission, so that only the smaller upper portion need be reached by maintenance and repair personnel.

In an embodiment of the invention an internal release valve can be located e.g. beneath the shroud and above the filter. The purpose of the valve is that if the filter itself become clogged sufficiently to prohibit the passage of oil through the filter, the valve opens and the oil bypasses the clogged filter. This helps prevent mechanical problems due to a lack of lubrication.

Accordingly, it is a primary object of the present invention to provide an apparatus for removing a gas from a fluid in which the inlet of the device is located at the same end thereof as the gas exit and the fluid exit.

Another object of the present invention is to provide an apparatus for removing entrapped air from oil in which the inlet of the apparatus is located at the same end thereof as the air and oil exits.

Another object of the present invention is to provide an apparatus in accordance with the prior objects in which a filter is provided for the removal of wear particles.

Still another object of the present invention is to provide an apparatus in accordance with the first two objects in which failure particles are collected.

Another object of the present invention is to provide an apparatus for separating air from oil in which the inlet is at the same end as the air and oil exits, and in which a filter is provided for separation of wear particles and in which means are provided for the collection and detection of failure particles.

It is still another object of the present invention to provide an invention in accordance with the preceding object in which the cavity for collection of failure particles is located at the same end of the device in which the inlet and outlets are located.

It is still another object of the present invention to provide release means which permit the passage of oil through the apparatus if the filter becomes sufficiently clogged to prevent the passage of oil.

It is still another object of the present invention to incorporate a combination of release means, false bottom, a shroud, and metal detector with the device in which the inlet and outlets are located whereby maximum effectiveness in separation and protection are achieved.

BRIEF DESCRIPTION OF THE DRAWINGS

The consideration of the embodiment of the invention, as well as further objects and advantages, will become further apparent from the following specification when considered with the accompanying drawings in which which like numerals refer to like parts wherein.

DESCRIPTION OF THE PREFERRED EMBODIMENT

Figure 1A:
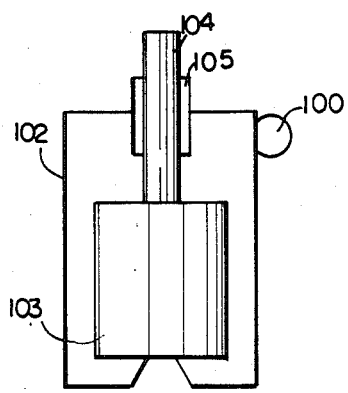
FIG. 1 is a schematic drawing containing several embodiments of the invention.
Figure 1B:
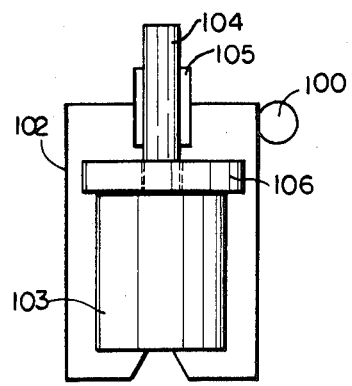
Figure 1C:
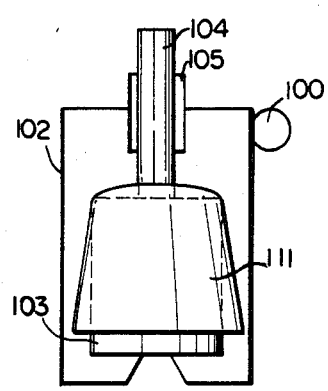
Figure 1D:
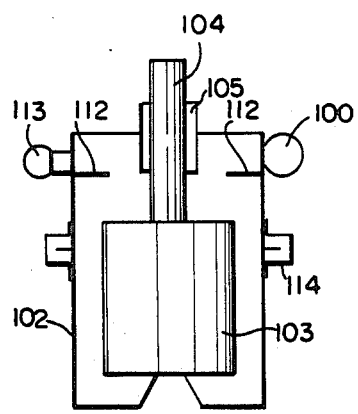
Figure 1E:
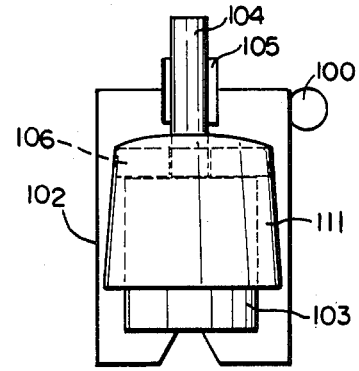
Figure 1F:
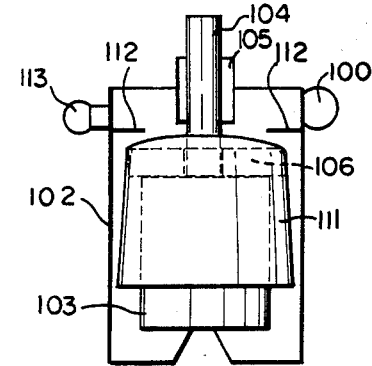
Figure 1G:
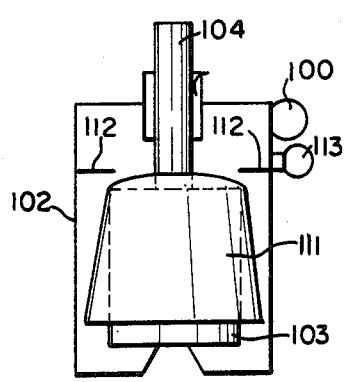
Figure 1H:
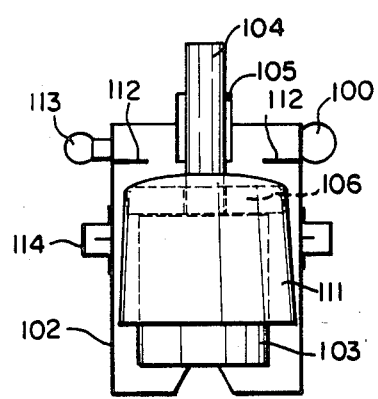
Figure 1I:
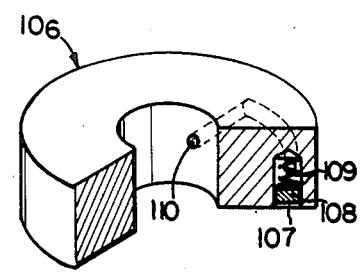

FIG. 1 provides simplified schematic drawings of eight embodiments of the invention. The purpose of FIG. 1 with devices A, B, C, D, E, F, G and H is to highlight specific elements without the many details of more complex drawings. Device I is a simplified description of one kind of a pressure release means referred to herein.

In Device A, FIG. 1, the mixture of oil and air enter tangentially at the top of the cylindrical housing 102 and is caused to cyclonically work its way down towards the bottom of the housing 102. The oil is then forced to travel through filter 103 and after passing through the filter 103 flow outward through the oil outlet tube 104. The air which entered with the oil via 100, being lighter, coalesces and moves toward the center of the device and passes into the gap formed by the oil and air outlet tubes where it is channeled outward via the air exit tube 105. Thus in A, the mixture of oil and air enters at the top of the device and the separated oil and separated air also leaves at the top.

Device B, FIG. 1, is similar to device A except that an internal pressure release valve 106 is shown and it is external to the filter 103. Device I is one example of an internal pressure release valve suitable for the present invention. Valve 106 sets atop filter 103. As shown, it is collar shaped and opening 107 occurs outside of the diameter of the filter 103. In opening 107 is a plug 108 and spring 109. Plug 108 is below opening 110 which connects to oil outlet 104. Spring 109 controls plug 108 so that under normal pressure plug 108 blocks any oil from bypassing filter 103. If pressure within the device exceeds the force exerted by spring 109 because of particles clogging filter 103, the plug 108 is forced upward past opening 110. When the plug 108 passes opening 110 a passage exists for the oil to bypass filter 103 and pass through opening 110 into the oil outlet tube 104.

Device C, FIG. 1, is similar to device A except that a shroud 111 is shown extending downward from oil outlet tube 104 and enclosing filter 103. As the oil and air mixture enter the housing 102 via inlet 100, the heavier oil coalesces outwardly and downward past shroud 111. After the oil reaches the end of the shroud 111, it then proceeds upward and flows into filter 103. The advantage of the shroud 11 is that it reduces substantially the possibility of the passage of any air through the filter 103.

Device D, FIG. 1, is similar to device A except that a false bottom 112 horizontally extends outward from the housing 102 towards the outlets 104 and 105. As the oil air mixture enters cyclonically, it can contain solid particles (not shown). The solid particles, generally metal particles, tend to be flung outwardly and being heavier tend to fall downward. In device D, these particles are trapped on false bottom 112. In this embodiment, a metal detector 113 monitors the amount of particles collecting on the false bottom 112 and as indicated hereafter, can alert as to possible mechanical problems. Device D is joined at joint 114. The configuration has the advantage in that filter 103 can be removed by removing the lower portion of housing 102 at joints 114 without requiring disassembly of metal detector 113, thereby saving manpower.

Device E, FIG. 1, is similar to device B except that in addition to an internal release means 106, shroud 111 (see device C) is also present. This embodiment has the advantages of both devices B and C.

Device F, FIG. 1, is similar to device B except that in addition to an internal release means 106, false bottom 112 and metal detector 113 (see device D) are also present. This embodiment has the advantages of both devices B and D.

Device G, FIG. 1, is similar to device C except that in addition to a shroud, false bottom 112 and metal detector 113 (see device D) are also present. This embodiment has the advantages of C and D. It should be recognized that metal detector 113 is a variation which can or cannot be present or its location can be moved. Thus, for example, in device B a metal detector (not shown) could be located at the bottom of housing 102.

Device H, FIG. 1, is a combination of devices E and F and has all the advantages of both devices.

Figure 2:
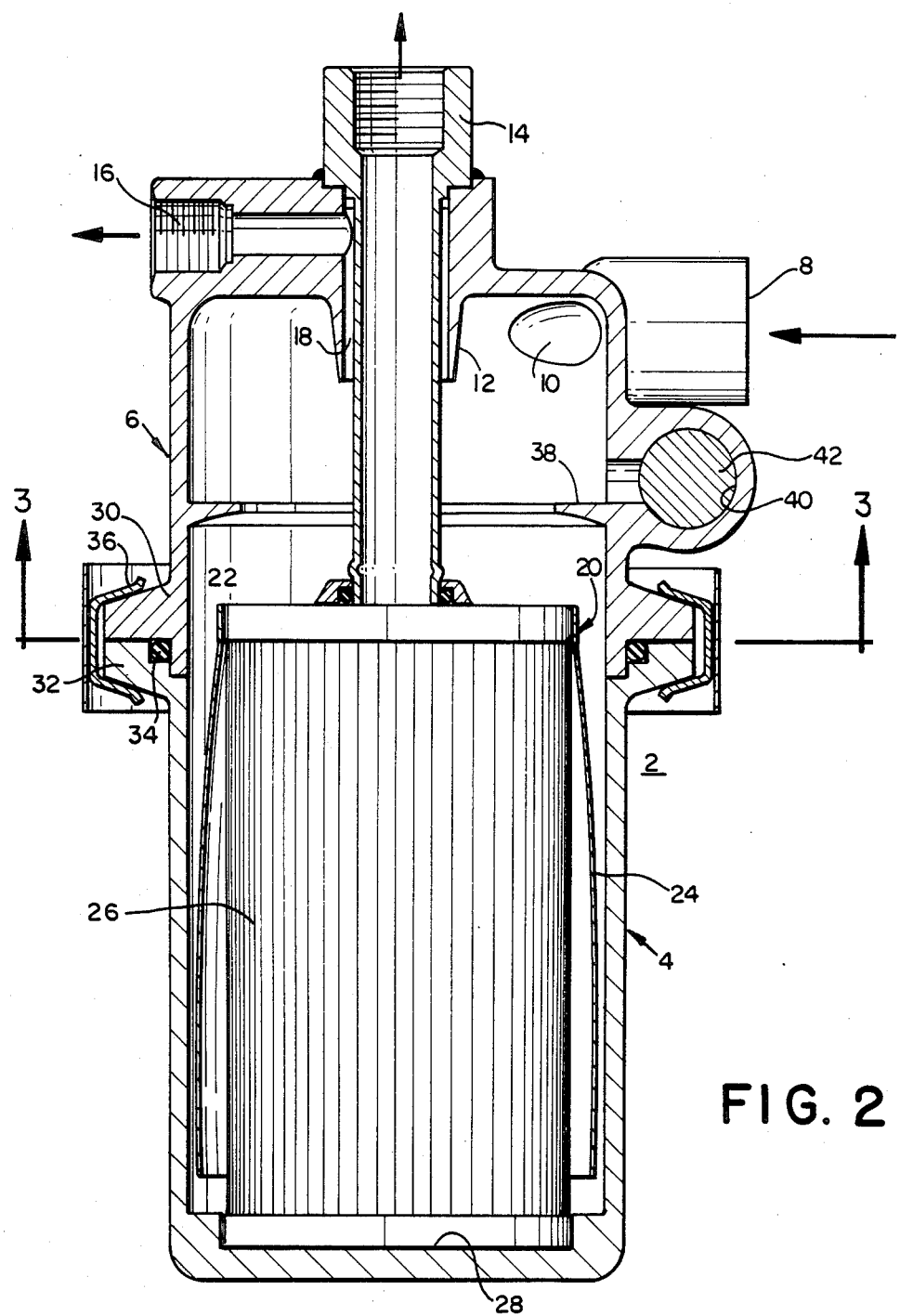
FIG. 2 is a side elevation view broken away showing a cross section of the preferred embodiment of the present invention.
Figures 3, 4:
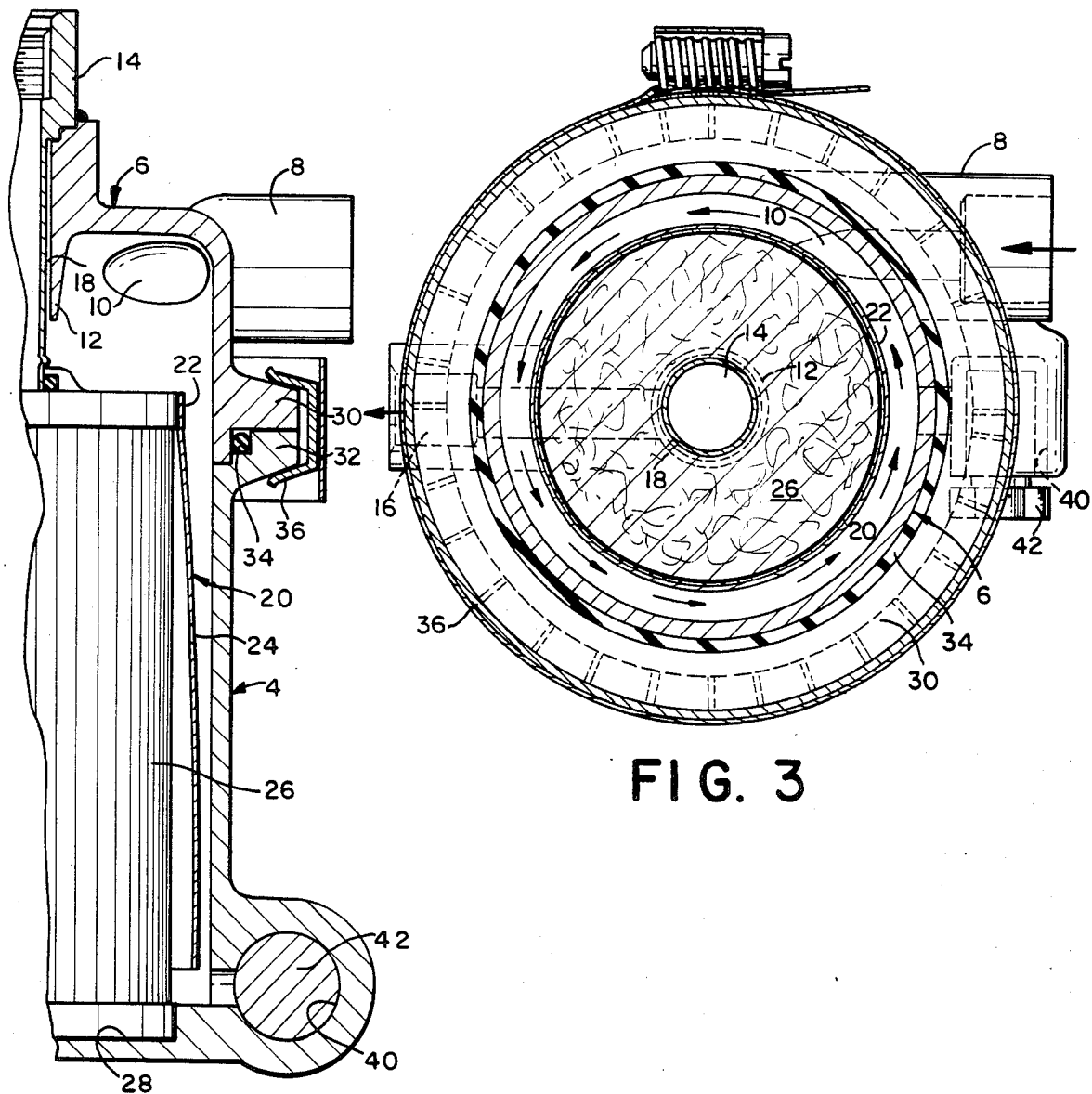
FIG. 3 is a horizontal cross section along line 3—3 in FIG. 2.
FIG. 4 is a partial side elevation of an alternate embodiment of the present invention.

Referring now to FIGS. 2, 3 and 4, several views are shown illustrating the preferred embodiment of a combination gas and liquid separator, in combination with an oil filter, a particle collection and detection system.

A housing 2 is shown which includes a lower portion 4 and an upper portion 6. The terms "upper" and "lower" are used herein to facilitate the description of the invention and are not intended to limit the orientation of the invention with respect to the earth's gravity; such reference is made only with respect to the drawings describing the present invention. As will hereinafter be described, the present invention may be oriented in any manner whatsoever with respect to gravity without materially affecting its performance for its intended function.

An inlet 8 is connected to the upper portion 6 of the housing 2. The oil that has entrapped air enters the upper portion 6 of the housing 2 through orifice 10. The upper housing 6 includes a downwardly extending air outlet tube 12, which is preferably formed as an integral part of the upper housing 6.

An oil outlet tube 14 is concentrically located within the air outlet tube 12 of the upper housing 6. The oil outlet tube 14 and the upper housing 6 are both threaded so that they may be screwed together, however, any other suitable means to connect them may be used. An air exit tube 16 is formed in the upper housing 6 so that it may communicate with a gap or space in the form of an annulus 18 which is formed between the oil outlet tube 14 and the air outlet tube 12.

A shroud 20 is connected to the lower portion of the oil outlet tube 14 by any suitable means, but preferably by clamping. The shroud 20 has a top portion or baffle 22 and a downwardly depending side portion 24. Located within the side portion 24 is a cylindrical oil filter 26. The oil filter 26 is designed to abut the bottom 28 of the lower portion 4 of the housing 2.

The upper and lower cylindrical housings 6 and 4 have abutting flanges 30 and 32, respectively. A seal such as an o-ring 34 is placed between the flanges which are appropriately designed to receive it. The mating flanges 30 and 32 are secured to one another by an annular v-clamp 36, however, other suitable connecting means may also be used.

An annular inwardly projecting lip 38 is shown integrally connected to the upper housing 6. A cavity 40 is shown in the upper housing 6 above lip 38. A particle detector 42 is shown engaged with the upper housing 6 so that it projects into the cavity 40. The purpose of the chip detector is to detect failure particles. The particular type of chip detector which is used for this purpose may be any one of many which may appropriately be selected by the designer. However, for most applications a magnetic sensor will be used. Such a magnetic sensor will be combined with appropriate electronic processing circuitry which will, in turn, be connected to an appropriate display so that detection of failure particles may be communicated to the equipment operator.

In the preferred embodiment of the invention, it may be seen that the side 24 of shroud 20 is in the form of a cone-like section, i.e., its diameter increases as it gets closer to the bottom of the lower housing 4. It has been found through experimentation that this increases the efficiency of the invention's removal of entrapped air from oil.

The actual shape of the shroud 20 should not be limited to the strict geometry of a cone-like section, but may take the form of other shapes. In the preferred embodiment of the invention, the cone-like shape actually has the geometry of a parabola, as is shown schematically in FIG. 1.

In operation, oil with entrapped air tangentially enters the separator through orifice 10 via inlet 8. Subsequent to entry, the oil and entrapped air are forced to travel in a helix due to the curvature of the upper housing 6. The oil and entrapped air are forced to cyclonically spiral downward. The centrifugal force induced by such motion forces the heavier failure particles toward the inner wall of the upper housing 6 and the entrapped air toward the center of rotation. The lighter failure particles remain suspended and travel with the oil.

The downward motion of the failure particles against the inner wall of the housing 6 is arrested by lip 38. This causes the failure particles to be thrown into the cavity 40 where they are sensed by the chip detector 42.

The oil and any remaining entrapped air are forced about the lip 38 and then outward and downward. The oil is forced around the shroud 20. The upper surface of the top portion 22 of the shroud aids in forcing any remaining entrapped air toward the center of rotation.

The air which travels towards the center of rotation flows into the space or gap 18 between the air outlet tube 12 and the oil outlet tube 14. The air then passes through the air exit tube 16 and leaves the separator where it is appropriately disposed of.

The oil continues its cyclonic spiral downward between the inner wall of the lower housing 4 and the outer surface of th side 24 of shroud 20. Upon reaching the bottom of the shroud 20, the oil reverses its direction and spirals upward by passing through the oil filter 26 and by passing through the gap between side 24 and the oil filter 26, prior to its passage through the filter.

The inclination of side 24 of shroud 20 is shown in the accompanying drawings and facilitates the upward travel of any remaining entrapped air. Additionally, it causes an increase in cyclonic velocity of the oil due to the restriction in area as the oil travels downward.

Figure 5:
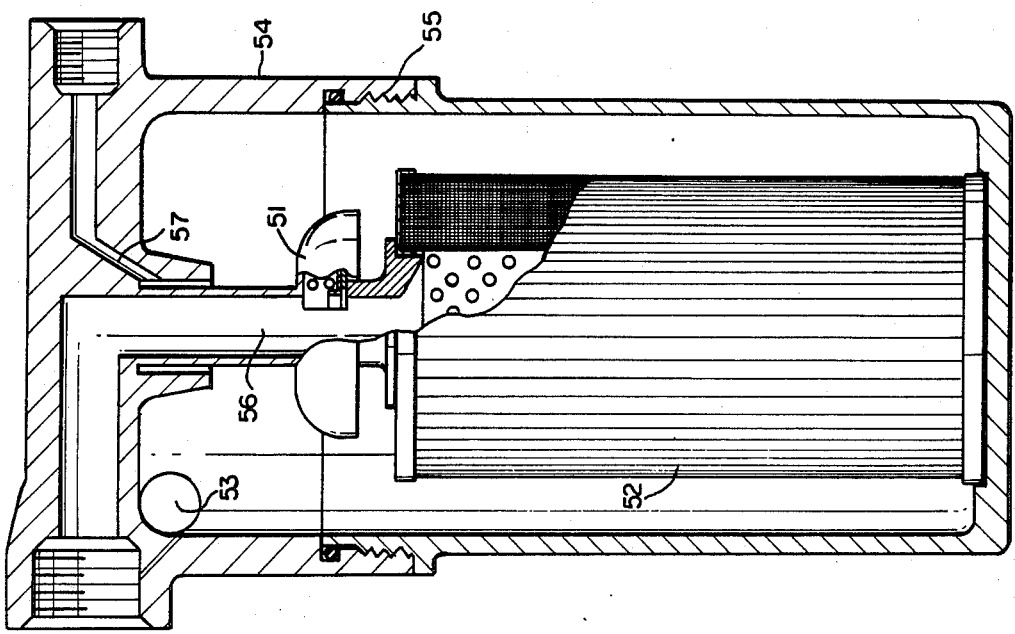
FIG. 5 is a side elevation view broken away showing a cross section of an embodiment of the present invention in which an internal pressure release means is external to the filter.

FIG. 5 shows more detail of the embodiment with an internal pressure release means 51 outside of the filter 52. The mixture enters, via inlet 53, tangentially within housing 54 which upper and lower portions are threaded together at 55. As the mixture enters the oil is tossed outwardly and drops downward and passes through filter 52 and travels upward and leaves via oil outlet 56, filter 52 traps solid particles but permits passage of the oil. The lighter air coalesces and travels outwardly via air outlet 57 which is located around oil outlet 56. Internal pressure release means 51 is disclosed in FIG. 1, device I.

Figure 6:
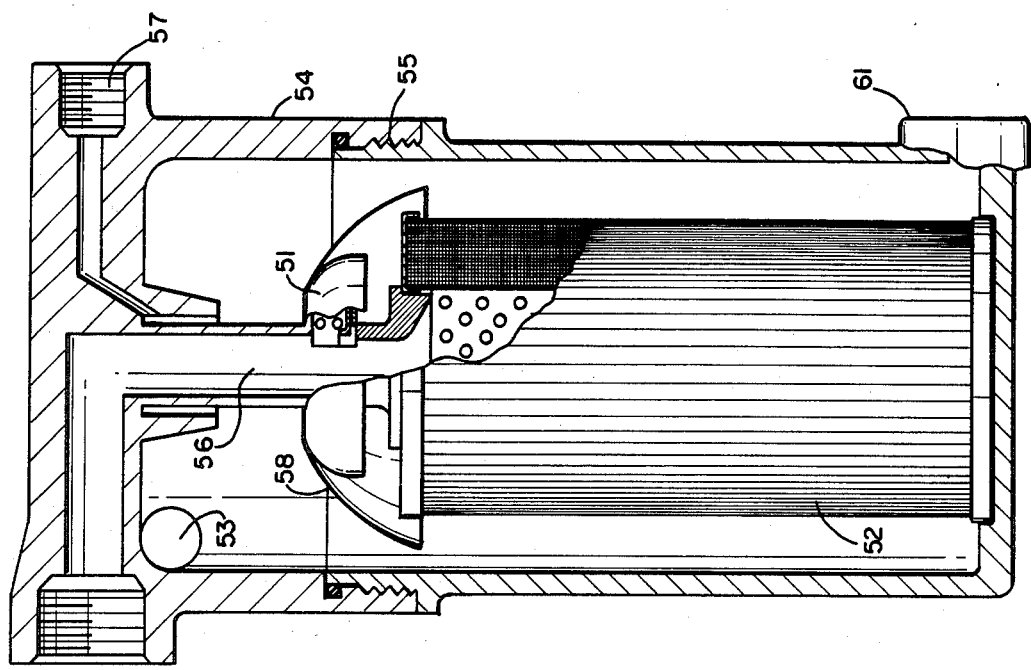
FIG. 6 is a side elevation now broken away showing a cross section of an embodiment of the present invention in which an internal pressure release means is external to the filter.

FIG. 6 shows more detail of the embodiment with an internal pressure release means 51 outside of the filter 52, and a shroud 58 and a metal detector 61. In this embodiment if the pressure within the housing 4 exceeds the desired pressure, the oil flows up under the shroud 58 and into the release means 51.

Figure 7:
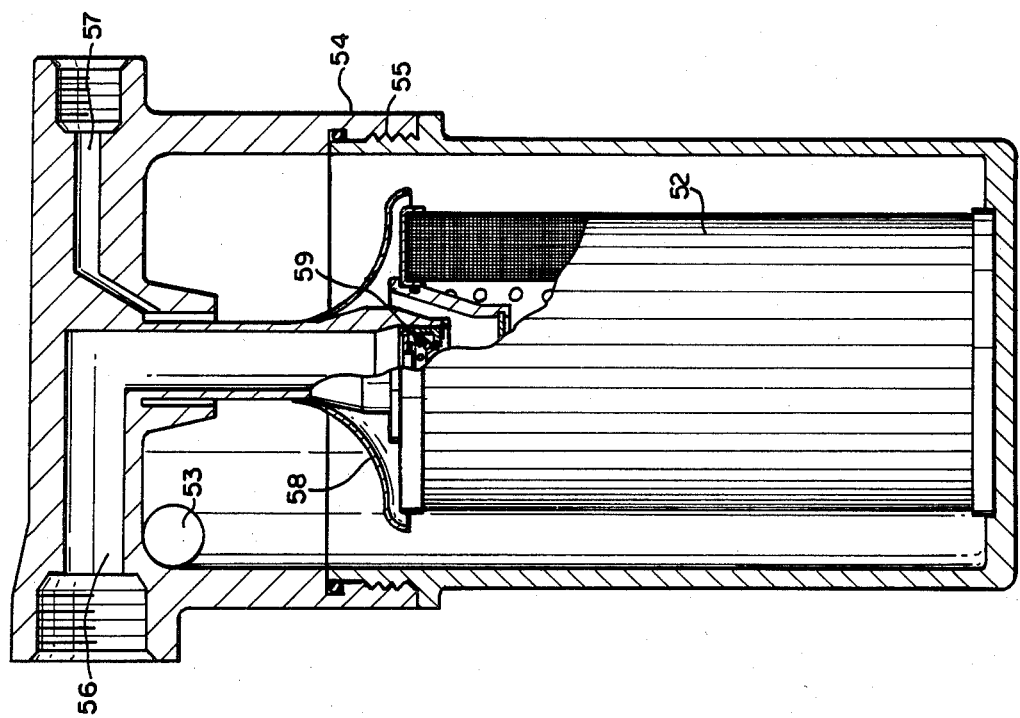
FIG. 7 is a side elevation view broken away showing a cross section of an embodiment of the present invention in which an internal pressure release means is within the filter.

FIG. 7 shows another detailed embodiment of a variation of FIG. 6. In FIG. 7, the internal pressure release means 58 is inside of the filter 52, and also has a shroud 58. In this embodiment of the pressure within the housing 54 exceeds the desired pressure, the oil flows up under the shroud 58 and into the internal release means 59. Release means 59 are well known to these skilled in the art.

Figure 8:
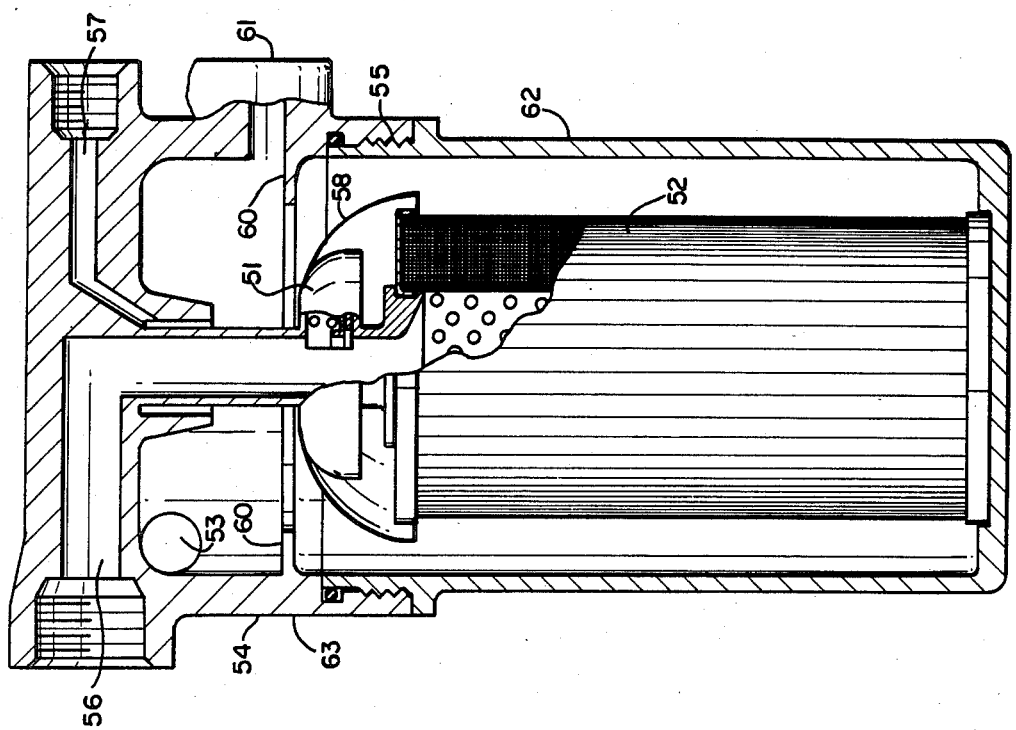
FIG. 8 is a side elevation view broken away showing a cross section of an embodiment of the present invention in which an internal pressure release means is external of the filter and a false bottom provides ease of maintenance and a shroud promotes more effective separation of oil and gas.

FIG. 8 shows more detail of the embodiment with an internal pressure release means 51 outside of the filter 52. Also shown is a shroud 58. FIG. 8 is similar to FIGS. 5 and 6 except that in addition is a false bottom 60 along with metal detector 61. FIG. 8 more clearly indicates how the lower portion of housing 62 can be separate from the upper portion of housing 63 and the filter 52 and release means 51 can be removed without having to disassemble the metal detector 61.

The description of the embodiments in connection with various figures describes the separation in terms of oil and air. However, one skilled in the art recognizes that the present invention can be used to a gas from a liquid equally as well.

Although the present invention has been described with reference to the particular embodiment herein set forth, it is to be understood that the present disclosure has been made only by way of example and that numerous changes in the details of construction may be resorted to without departing from the spirit and scope of the invention. Thus, the scope of the invention should not be limited by the foregoing specification, but rather only by the scope of the following claims of the invention.

What is claimed is:

1. In a fluid lubrication system for mechanical drives, a separator for separating a gas from a liquid which comprises:
    (a) means for causing the liquid and entrapped gas to engage in a cyclonic flow pattern, which includes a housing having a first end and a second end, and wherein a filter is operatively connected to the first end whereby the leaving liquid passes through the filter which stops solid particles, and wherein said liquid tangentially enters said housing at said first end;
    (b) means operatively connected to said first end for removing the liquid;
    (c) means for removing the separated gas, connected to said first end; and
    (d) an internal pressure release means is operatively connected to the filter and the first end whereby when pressure within the separator exceeds a desired pressure, this release means permits the liquid to bypass the filter.

2. According to claim 1, a separator wherein a shroud is operatively connected to the first end for removing the liquid whereby separation of the liquid and gas in enhanced.

3. According to claim 2, a separator wherein a false bottom projects inwardly and is operatively connected to the separator whereby the collection of solid particles is enhanced.

4. According to claim 3, a separator wherein the solid particles are metallic and externally to the separator is a metallic detector which operatively measures the amount of metal particles collected on the false bottom.

5. According to claim 1, wherein the means for removing the liquid is contained concentrically with the means for removing the gas.

6. In a fluid lubrication system for mechanical drives, a separator for removing entrapped air from oil which comprises:
    (a) an upper housing;
    (b) a lower housing adapted to be connected to said upper housing;
    (c) an inlet connected to said upper housing for permitting oil and entrapped air to tangentially enter said upper housing;
    (d) a downwardly projecting air outlet tube connected to said upper housing;

(e) an oil outlet tube concentrically oriented within said air outlet tube and connected to said upper housing;

(f) a filter operatively connected to oil outlet tube whereby the leaving oil passes through a filter which stops metallic particles; and (g) an internal pressure release means operatively connected to the filter and the oil outlet tube whereby when pressure within the separator exceeds desired pressure the release means permits the oil to bypass the filter.

7. According to claim 6, a separator wherein a shroud is operatively connected to the first end for removing oil whereby separation of the oil and air is enhanced.

8. According to claim 7, a separator wherein a false bottom projects inwardly and is operatively connected to the separator whereby the collection of metallic particles is enhanced and externally to the separator is a metallic detector which operatively measures the amount of metal particles collected on the false bottom.

* * * * *